United States Patent [19]

Lempkowski et al.

[11] Patent Number: 5,621,413
[45] Date of Patent: Apr. 15, 1997

[54] VEHICLE-GROUND SURFACE MEASUREMENT SYSTEM

[75] Inventors: Robert B. Lempkowski, Elk Grove; Sanjar Ghaem, Palatine; W. J. Kitchen, North Barrington, all of Ill.

[73] Assignee: Motorola Inc., Schaumburg, Ill.

[21] Appl. No.: 496,512

[22] Filed: Jun. 29, 1995

[51] Int. Cl.$^6$ ..................................................... G01S 13/60
[52] U.S. Cl. ........................... 342/117; 342/188; 342/106; 342/115
[58] Field of Search ................................ 342/117, 188, 342/106, 107, 109, 113, 114, 115, 116

[56] References Cited

U.S. PATENT DOCUMENTS

| Re. 29,401 | 9/1977 | Aker et al. | 342/115 |
|---|---|---|---|
| 3,833,906 | 9/1974 | Augustine | 343/784 X |
| 3,898,653 | 8/1975 | Ban et al. | 342/109 |
| 4,035,797 | 7/1977 | Nagy | 342/104 |
| 4,050,071 | 9/1977 | Clorfeine | 342/117 |
| 4,065,745 | 12/1977 | Robinson | 342/117 X |
| 4,107,680 | 8/1978 | Kaplan | 342/115 |
| 4,148,027 | 4/1979 | Nowogrodzki | 342/117 X |
| 4,346,774 | 8/1982 | Hirota et al. | 342/104 X |
| 4,517,566 | 5/1985 | Bryant et al. | 342/117 |
| 4,635,059 | 1/1987 | Ball | 342/117 |
| 4,899,163 | 2/1990 | Daniel et al. | 343/700 MS |
| 4,980,633 | 12/1990 | Roskoni | 342/115 |
| 5,204,682 | 4/1993 | Beasley | 342/117 |
| 5,239,516 | 8/1993 | Kimura | 367/91 |
| 5,287,329 | 2/1994 | Ikeda | 367/91 |
| 5,367,307 | 11/1994 | Dupuis et al. | 343/700 MS |

FOREIGN PATENT DOCUMENTS

WO9201951 2/1992 WIPO .

*Primary Examiner*—John B. Sotomayor
*Attorney, Agent, or Firm*—Nicholas C. Hopman

[57] ABSTRACT

A measurement device (103) and method determines various metrics between a vehicle (101) and a ground surface (105) using a transmitter-antenna (109) for emitting energy including a portion directed down toward the ground surface. A receiving antenna (115), has a portion oriented facing toward the transmitter-antenna for receiving a portion of the emitting energy along a direct path (117), and a portion oriented facing downwardly toward the ground surface for receiving a portion of the emitting energy reflected from the ground surface along a reflected path (113). A decoder provides separate indications of forward (121) and sideward (123) velocity relative to motion of the vehicle along the ground surface. Furthermore, the decoder comprises means for determining vehicle height (125) dependent on a measured difference in path length, vehicle level (127), or front to rear tilt angle, dependent on polarization elliptical ratio changes, and road surface conditions (129) dependent on amplitude and phase changes that occur versus time.

17 Claims, 4 Drawing Sheets

VEHICLE-GROUND SURFACE MEASUREMENT SYSTEM

FIELD OF THE INVENTION

This invention is generally directed to the field of vehicle-ground surface measurement using radar principles.

BACKGROUND OF THE INVENTION

For various applications it is useful to measure true ground velocity in forward and sideward directions, vehicle front to rear level, and height of a vehicle. Furthermore, it is also useful to measure the ground cover or surface conditions to predict if there is snow, rain or other coatings on the road surface. These metrics can be used in vehicle navigation, antiskid braking, and ride leveling systems. A class of prior art approaches use radar apparatus that overcome many disadvantages of other measurement methods. However, contemporary radar based vehicular ground speed sensors have their share of problems primarily related to complexity and lack of full function.

For one, without significant complexity prior art approaches measure ground velocity in one dimension only—such as forwards-rearwards. Furthermore, the accuracy of these systems is relatively poor.

One arrangement of a radar based vehicle-ground surface sensor is a monostatic configuration. In this type of configuration a singular antenna transmits a signal from underneath a vehicle to a ground surface. A portion of the transmitted signal is reflected back from the ground surface to the antenna and is analyzed. A frequency of the received signal will differ from the transmitted signal dependent on a speed of displacement between the vehicle and the ground surface. The speed vs. frequency phenomena is known as the Doppler effect, and the measurement of the reflected signal is known as backscatter measurement. Although this approach is relatively simple, the nonostatic configuration is not capable of distinguishing a change in the vehicle level and/or vehicle height perpendicular to the ground surface, from a change in speed planar with the ground surface. This deficiency is particularly troublesome when measuring true ground speed on rough roads because the vehicle height will change frequently as the vehicle bounces. Additionally, dynamic vehicle tilt, or pitch attitude may be interpreted as a change in planar speed. At the same time there is no mechanism for measuring vehicle height in this type of system independent of planar speed measurement. Furthermore, the received signal strength in a backscatter measurement arrangement can be very low with some ground surfaces, requiring a significant investment in complexity of the required signal processing circuitry. Although a mounting angle of the antennas can be changed to increase backscatter it is done so at the expense of adding perpendicular speed error.

One approach to solve the perpendicular speed errors, associated with dynamic changes in vehicle height, has been to use plural antennas. Plural antenna arrangements include an approach that transmits and receives signals downwardly to the ground surface in opposite directions, usually in forward and rearward directions at equal and opposite angles displaced from a vertical plane. This arrangement is a so-called "Janus" configuration. A purpose of the "Janus" configuration is to eliminate the effect of vertical measurement error caused by a change in the difference between the vehicle height from the ground surface, by adding and subtracting the received backscatter signals to derive sum and difference signals from which planar speed is determined. The "Janus" type of approach is complex and costly because of the two complete antenna and transceiver systems. Furthermore, this arrangement only measures velocity in one plane of travel—such as forwards-backwards, and has no means to measure height of a vehicle or ground surface conditions.

Another plural antenna approach uses a separate transmit and receive antenna. This arrangement is known as a bi-static configuration. Known prior art systems configured the separate transmit and receive antenna in a backscatter measurement arrangement. A disadvantage of this approach is that the angle to the surface changes with vehicle ride height, which causes speed inaccuracies when computing a Doppler return effect. As with the Janus configuration this prior art arrangement only measures velocity in one plane of travel—such as forwards-backwards, and has no means to measure height of a vehicle or ground surface conditions.

What is needed is an improved approach for measuring various vehicle-ground surface parameters such as vehicle planar velocity in orthogonal directions, true ground speed, vehicle front to rear tilt, vehicle-ground surface height and various road surface conditions such as rain and snow.

DETAILED DESCRIPTION OF A PREFERRED EMBODIMENT

In a preferred embodiment a measurement device determines various metrics between a vehicle and a ground surface. This device includes a transmitter-antenna for emitting energy including a portion directed down toward the ground surface. A receiving antenna, has a portion oriented facing toward the transmitter-antenna for receiving a portion of the emitting energy along a direct path, and a portion oriented facing downwardly toward the ground surface for receiving a portion of the emitting energy reflected from the ground surface along a reflected, or indirect path. A decoder provides separate indications of forward and sideward velocity relative to motion of the vehicle along the ground surface. Furthermore, the decoder comprises means for determining vehicle height dependent on a measured difference in direct to indirect path length, vehicle front to rear tilt angle dependent on polarization elliptical ratio changes of energy associated with the direct and indirect path, and road surface conditions dependent on amplitude and phase changes that occur versus time of the energy associated with the direct and indirect path.

Figure 1:
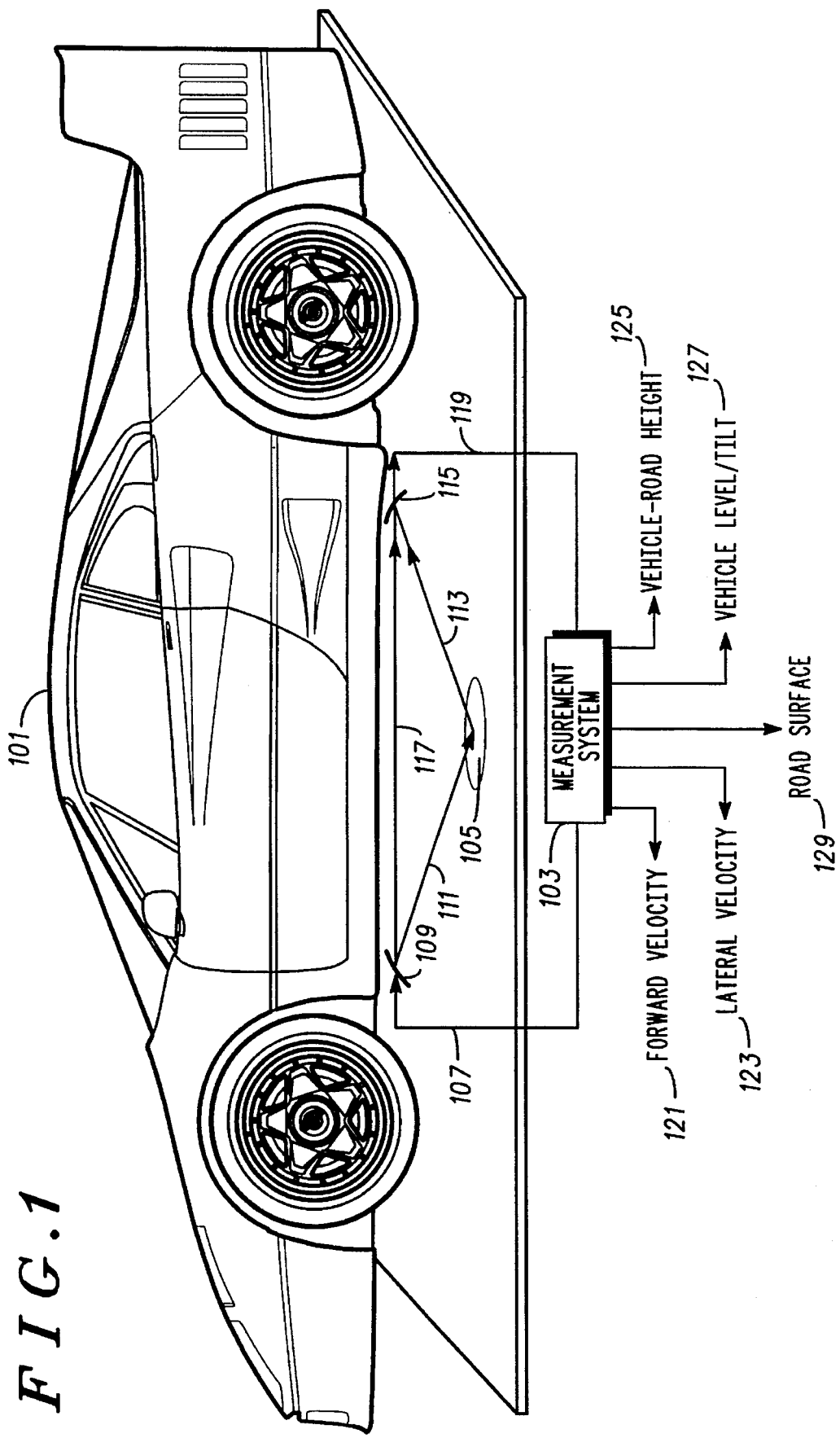
FIG. 1 is a system block diagram of a vehicle-ground surface measurement system.

FIG. 1 is a system block diagram of a vehicle-ground surface measurement system. The measurement system 103 measures various relationships between the vehicle 101 and a road surface 105. The measurement system 103 provides a source signal 107 to a transmitting antenna 109. The transmitting antenna 109 emits its energy 111 downward towards the ground surface 105. A portion of the emitted energy 111 is reflected off the ground surface 105 and shown at reference number 113. The reflective portion of the energy 113 is provided to a receiving antenna 115. The path associated with reference numbers 111 and 113 is an indirect path. Additionally, a portion of the emitted energy from the transmit antenna 109 is provided along a direct path 117 to the receiving antenna 115. The receiving antenna 115 provides a signal 119 back to the measurement system 103.

In the various preferred apparatus and methods described later the measurement system 103 provides several metrics associated with vehicle 101 in relationship to the ground surface 105. These include a measurement of forward velocity 121, lateral velocity 123, vehicle-road height 125, vehicle front to rear level, or tilt 127, and road surface conditions 129. To accomplish this, both the transmit antenna 109 and the receiving antenna 115 are designed to have a polarization geometry including a first polarization and a second polarization oriented orthogonally to the first polarization. This can be better understood by introducing details of the antenna and decoder (or measurement system) design described below.

Figure 2:
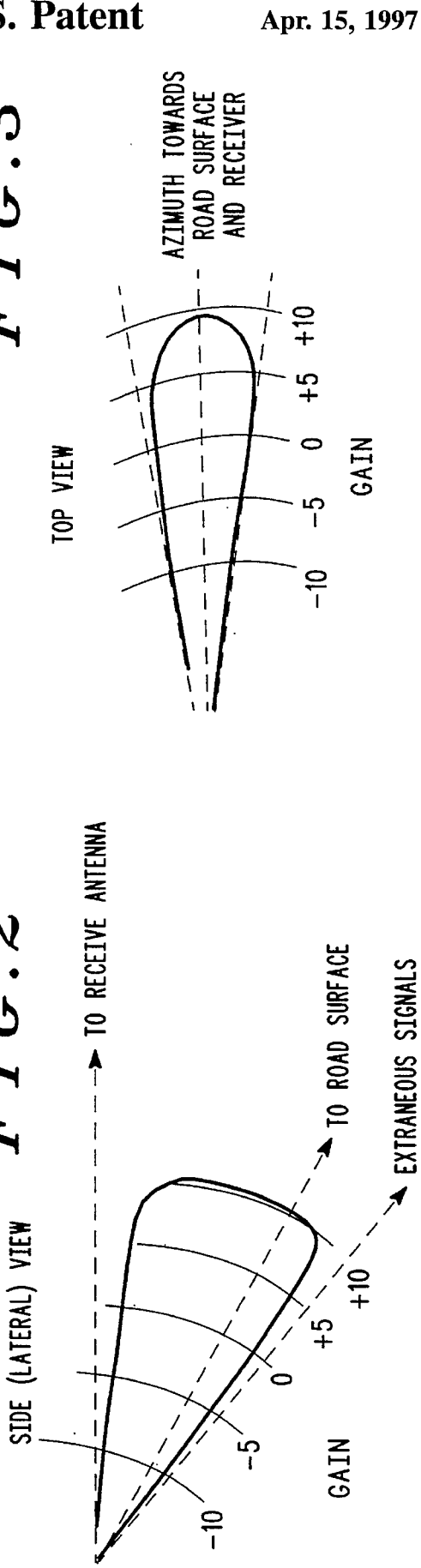
FIG. 2 is a view of a preferred elevation pattern for a transmit antenna in accordance with a preferred embodiment of the invention.

FIG. 2 is a view of a preferred vertical (elevation) antenna pattern for the transmit antenna 109. The antenna's gain is depicted whereby the maximum signal strength is directed at an angle toward the road surface (the depression angle formed between 117 and 111, FIG. 1). A prescribed portion of the energy below the maximum level is directed toward the receive antenna, at a level which corresponds approximately to the average road surface reflection losses and additional path losses for the installation. Signals at angles greater than the maximum expected depression angles are reduced by as much as practical (shown as extraneous signals in FIG. 2).

Figure 3:
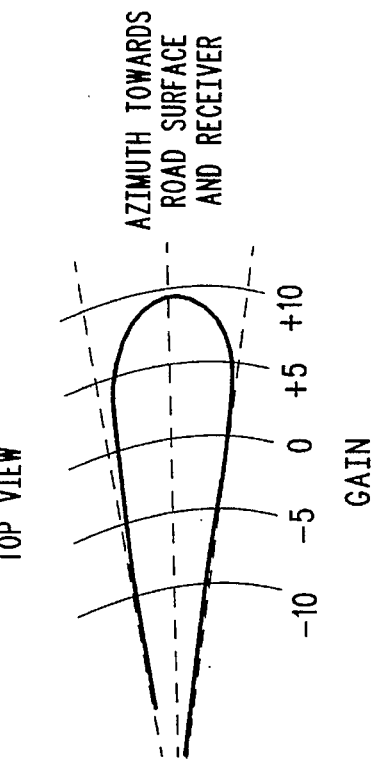
FIG. 3 is a view of a preferred azimuth (lateral) polarization pattern of the transmit antenna in accordance with the preferred embodiment of the invention.

FIG. 3 is a view of a preferred lateral (azimuth) antenna pattern of the transmit antenna 109. The antenna's pattern has its maximum gain at the nominal depression angle towards the road surface as shown, with a preferred beamwidth of approximately ±10°. This beamwidth should create a suitable reflection zone 105 which will average the surface characteristics, with minimal extraneous reflections. This beamwidth should be sufficient to present a signal approximately 15 dB below the maximum in the direction pointing to the receiver.

The receiving antenna 115 has the same pattern and polarization characteristics as the transmitting antenna 109. The antennas 109 and 115 are oriented facing toward each other, as shown in FIG. 1.

Figure 4:
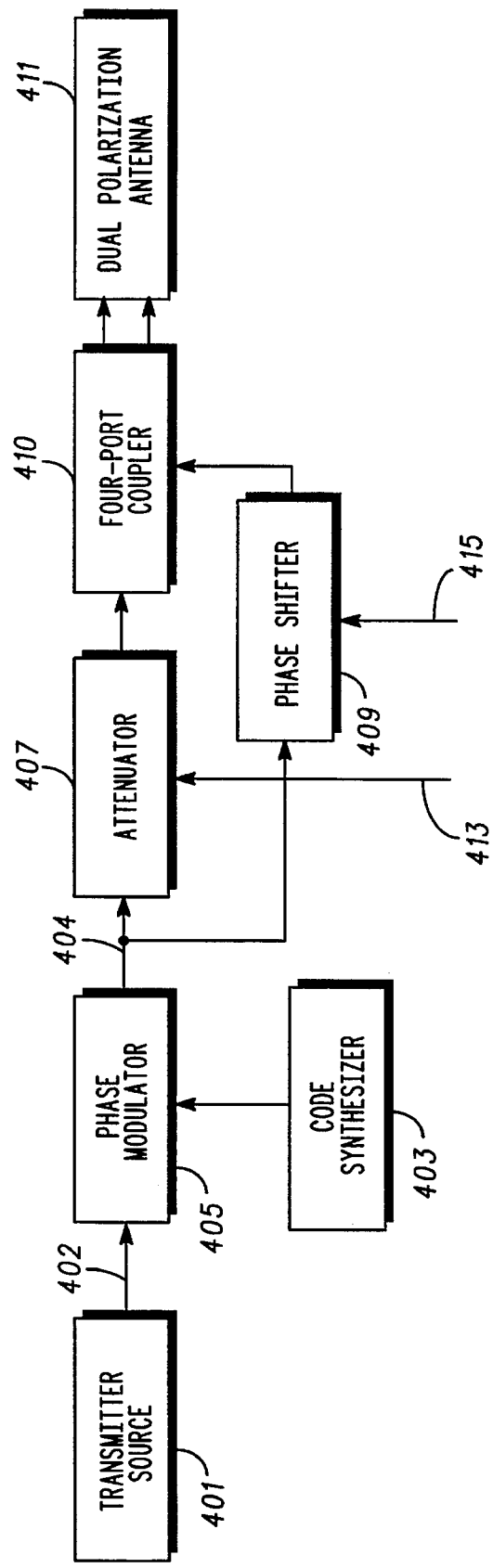
FIG. 4 is a schematic block diagram of a preferred hardware platform for a transmitter portion of the disclosed measurement system.

FIG. 4 is a schematic block diagram of a preferred hardware platform for a transmitter portion of the measurement system. Depending on a system modulation format chosen, the transmitter source 401 can be a stabilized oscillator (phase-locked or mechanically tuned) for phase modulated systems, or a voltage-controlled oscillator (VCO) for frequency modulated systems. Here the transmitter source 401 is a dielectrically stabilized puck oscillator (DSO) and it outputs a carrier-frequency signal 402, here at 20 GHz. Because the physical separation and angles of the indirect path 111, 113 and the direct path 117 of the transmitting and receiving antennas 109 and 115 may be longer than one wavelength of the signal 402 a signal coding structure needs to be added. This is because without signal coding it would not be possible to resolve ambiguities in phase measurements associated with a depression angle between portions of the direct 117 and indirect paths 111.

A code generator 403 synthesizes a predictable code sequence. A phase modulator 405 modulates the signal 402 by the provided by the code sequence generated by the code generator 403 and provides an encoded signal 404. The encoded signal 404 is split into two signal paths. One path passes through a variable attenuation device 407, to a four-port coupler 410. The four-port coupler in turn drives a first antenna port of a dual polarization antenna 411. The second signal path from phase modulator 405 drives a variable phase shifter 409. The variable phase shifter 409 then drives the four-port coupler 410, to a second port of a dual polarization antenna 411. Preferably, the second port of the dual polarization antenna 411 is oriented orthogonally to the first port. In the preferred configuration the four-port coupler 410 is shown as a 90° backward-wave coupler. Alternatively, the four-port coupler 410 may be a branch-line hybrid coupler, or another design if preferred.

By controlling the settings of the attenuator 407 and phase shifter 409, via lines 413 and 415 respectively, signals of any arbitrary polarization can be transmitted by the dual polarization antenna 411. This is useful for determining ground surface characteristics as will be detailed later. For instance in a horn antenna configuration the dual polarization antenna 411 preferably is constructed with a linear horizontal polarization feed separated from the linear vertical polarization feed by a difference of $\lambda/2$ at the operating wavelength— here roughly 0.75 cm at an operating frequency of 20 GHz. In practice the guide wavelength is slightly less than the free-space wavelength shown above. By proper control of the adjustable networks 407 and 409, via lines 413 and 415 a linear horizontal, or linear vertical, or other polarization signal can be generated. In practice, amplitude and phase errors of the two channels can be compensated by modifying the exact calculated settings (i.e., 88.5° instead of 90° when a 1.5° phase tracking error between the feed ports is measured by the receiver).

Figure 5:
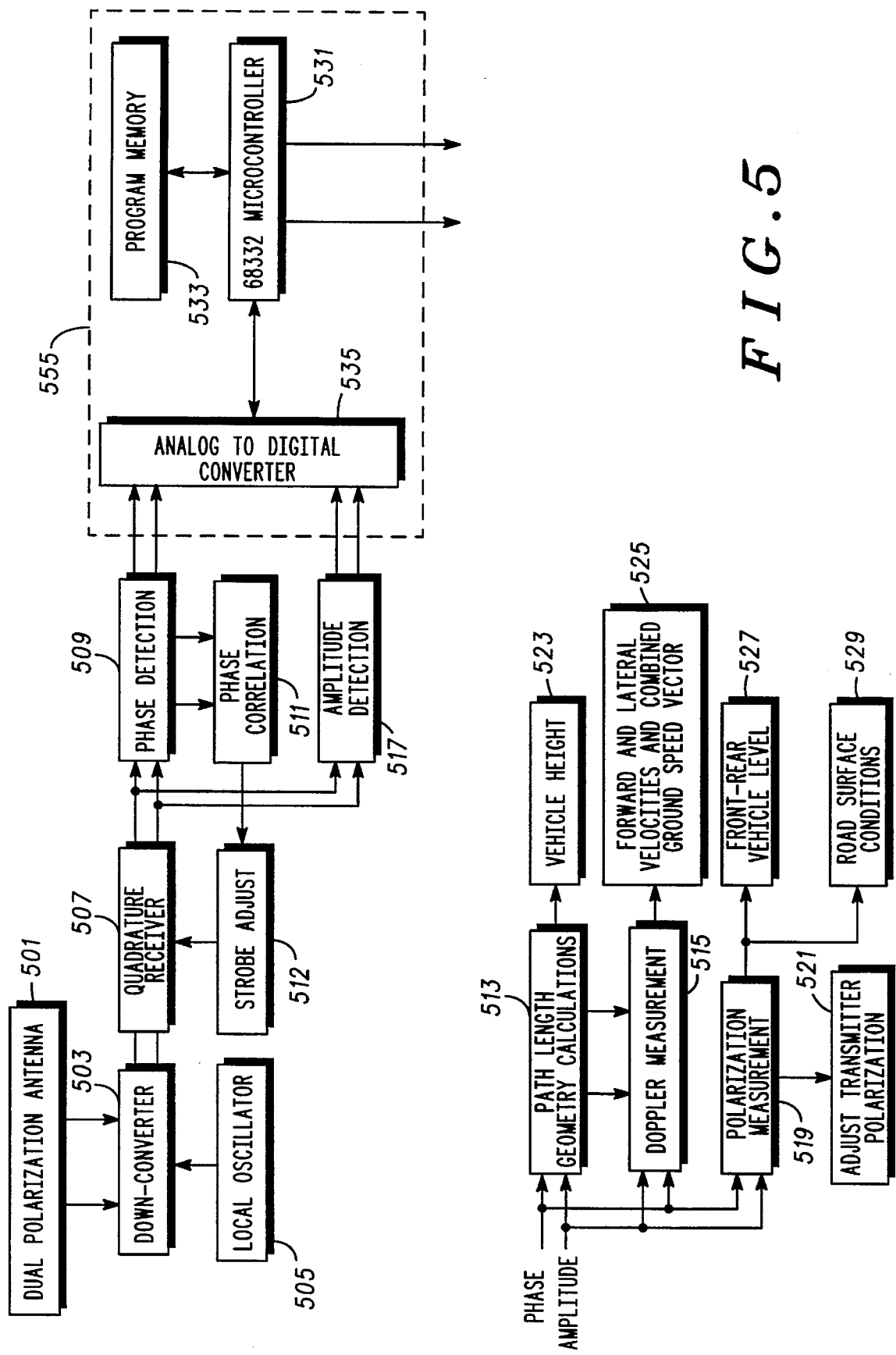
FIG. 5 is a schematic block diagram of a preferred hardware platform for a receiver-decoder portion for the measurement system.

FIG. 5 is a schematic block diagram of a preferred hardware platform for a receiver-decoder portion for the measurement system 103. The receiver and decoding functions produce the metrics introduced in FIG. 1 including measurement of forward velocity 121, lateral velocity 123, vehicle-road height 125, vehicle front to rear level, or tilt 127, and road surface conditions 129.

The receiver-decoder portion for the measurement system 103 can be broken down into a pre-processing stage which includes elements 501, 503, 505, 507, 509, 511, 512, and 517, which are implemented in conventional circuitry, and a post-processing stage contained within the clashed line labeled 555 that is implemented by software operating on a computer. The post-processing stage or computer 555 is used to perform path length processing 513 for determining vehicle height 523, Doppler processing 515 for determining vehicle forward velocity, lateral velocity, and a combined ground speed factor 525, and polarization ellipsometry 519 and 521 used for determining front to rear vehicle leveling 527 and measuring road surface conditions 529.

Preferably, the computer 555 is constructed using a Motorola 68332 microcontroller 531. In support of the Motorola 68332 microcontroller, the computer 555 includes program memory 533 in the form of EPROM (Erasable Programmable Read Only Memory), and suitable interface circuitry to transform the various input signals into information usable by the Motorola 68332 microcontroller including an analog to digital converter 535. This type of computer 555 is easily constructed by those skilled in the art. Later, in FIG. 6 a flow chart is presented that symbolically describes the various method steps encoded into the computer's program memory.

Returning to the preprocessing portion of the receiver-decoder portion of the measurement system 103 is comprised of two separate channels of processing elements that each provide quadrature relationships of amplitude and phase from two different antenna ports. In the preferred configuration, the antenna ports are horizontal and vertical polarization, the content of which contains the lateral and forward vehicle motions. A dual polarization antenna 501 provides two orthogonal polarization outputs to the front-end of the receiver-decoder to be downconverted to a lower frequency range for ease of processing. A conventional down-converter 503 accomplishes this frequency down-conversion under the direction of a conventional local oscillator 505. A two-channel quadrature receiver 507 is employed to separate and low-pass filter the in-phase and quadrature oriented signals received from the dual polarization antenna 501. The quadrature receiver 507 uses a strobe to provide a sampling signal to obtain the incoming data at the proper intervals. A conventional phase detection circuit 509, a conventional strobe adjust circuit 512 and a conventional phase correlation circuit 511 are used to set the sampling strobe to the times when the incoming direct path received signal monitors the phase changes corresponding to that of the transmit phase modulation. In this way, later-arriving reflected path received signals, with the preferred 0°–180° bi-phase modulated transitions imposed on them, can be directly measured to establish a time delay for the reflected path length calculations described later in reference to block 513. This calculated time delay acts as a "coarse" path length measurement, refined by the "fine" measurement provided by the phase measurement of the reflective portion of the energy 113.

The phase detection circuit 509 also outputs a signal representing a phase metric for both of the orthogonally oriented signals received from the dual polarization antenna 501. Also a conventional amplitude detection circuit 517 outputs a signal representing an amplitude metric for both of the orthogonally oriented signals received from the dual polarization antenna 501.

Figure 6:
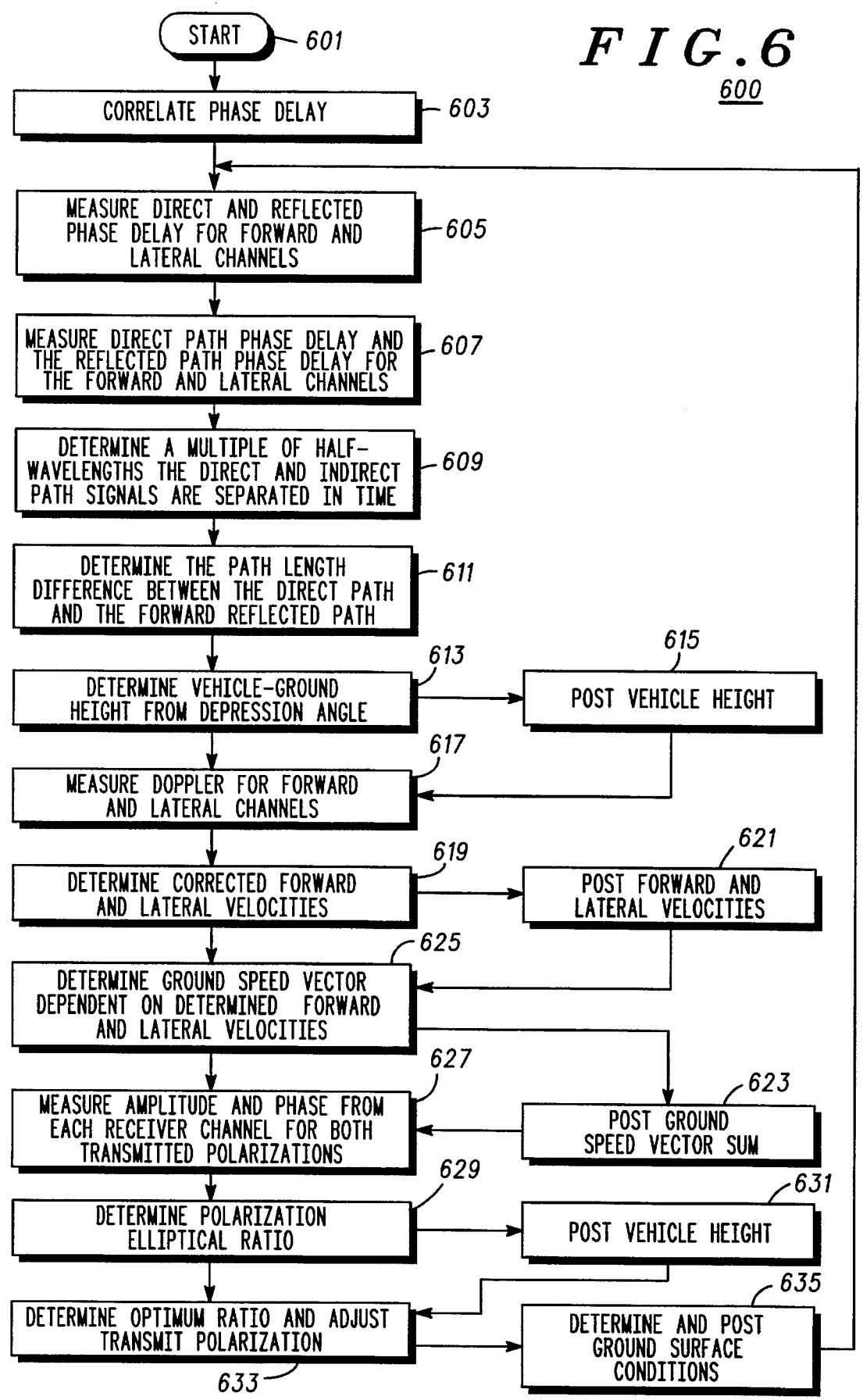
FIG. 6 is a flow chart for carrying out a preferred method in accordance with the preferred embodiment of the invention.

Both the phase and amplitude metrics are input via the analog to digital converter 535 to the computer 555 for later derivation of forward velocity 121, lateral velocity 123, vehicle-road height 125, vehicle front to rear level, or tilt 127, and road surface conditions 129 via the preferred method steps described next in FIG. 6.

As mentioned earlier, FIG. 6 is a flow chart for carrying out a preferred method in accordance with the preferred embodiment of the invention. The steps represented here in the flow chart are microcoded into the program memory of the computer 555 earlier described in FIG. 4. The routine 600 runs continuously and commences at a start step 601.

First path length geometry calculations shown in FIG. 5 at reference number 513 will be executed in step 603. In step 603 a phase delay between the direct path 117 and the indirect path 111, 113 is correlated, using the lateral receive channel that represents the preferred horizontal polarization. The received energy associated with the horizontal (lateral) orientation has a lower degree of Doppler content than the vertical orientation thereby easing the measurement and allowing a narrower detection bandwidth for improved sensitivity. The relative phase transitions of the transmit modulated energy are compared from the known period for the direct signal path 117 with the unknown reflected path 111, 113. The phase delay between the two signals will be measured by the quadrature receiver 507.

After the phase delay between direct and reflected paths are correlated, the system measures the difference between the direct path and the reflected path phase delay for both the forward and lateral channels in step 605.

Next in step 607, determine a multiple of half-wavelengths the direct and indirect path signals are separated in time. When the delays in the relative path length differences between the direct and reflected paths are multiples of a wavelength (or 1.5 cm at 20 GHz which could occur at about a 10° depression angle for a typical installation, the angle from 117 to 111 in FIG. 1.), the phase detector would normally not produce an output at the modulation transitions. However, since the reflected signal experiences a Doppler distribution due to the fresnel zone reflection, the phase correlator bandwidth will pass these Doppler differences from the direct path for measurement when the vehicle is in motion, or interpret the small phase differences of the reflected signal when it is actually sampled. So, in step 609 a history of the previous readings is used to determine when the height passes through a value which corresponds to when the solution is an even multiple of a wavelength. In this case, a different range of ride height is being measured directly by the phase correlator. For example, for the preferred embodiment of FIG. 1. with a separation distance of 2 meters, and an installed height of 20 cm for antennas 109 and 115, the depression angle α would be defined as:

$$\tan\alpha = \frac{\text{height}}{\text{directpath}/2}$$

and the relationship for direct and reflected paths defined by the equation:

$$\cos\alpha = \frac{\text{directpath}/2}{\text{reflectedpath}/2}$$

Solving the above recited equation for a 10° depression angle α would give the reflected path a half-length difference of 0.015 meters, or a total of 3 cm longer than the direct path. For ride heights lower than 20 cm height, the reflected path would be shorter, and be counting between 1 and 2 wavelengths difference. For depression angles between about 7° and 10°, the counter would be on the same increment for heights between 12.5 to 17.5 cm.

Then in step 611 a path length difference between the direct path and the forward reflected path is determined. The path length difference is determined from the combination of the wavelength counter 609 and the phase measurement between the direct path and the forward reflected path in step 611.

Then, in step 613 the system calculates the vehicle to ground height as discussed above. This calculation assumes that the ride height is the same for both antennas. Should this be found not to be the case, and the ride is found not level as discussed below, a modified calculation is made which takes the vehicle tilt into account.

In step 615, the vehicle height is then posted to be used by external routines such as those associated with navigation and suspension control.

Next, in step 617 the Doppler information is obtained from the frequency comparison of the direct and reflected signal paths of the individual forward and lateral channels. Since the Doppler content will have a distribution about a narrow frequency range due to the fresnel reflection off of the ground surface, the peak of the distribution can be measured and utilized, or other method.

Next, in step 619 the forward and lateral velocities are monitored, and corrected for their effect from depression angle, providing true forward and sideward velocities. Once the corrected forward and lateral velocities are determined, they are posted in step 621 to external routines. Then, in step 625, a true ground speed vector is determined dependent on the determined forward and lateral velocities and posted in step 623 to external routines.

The amplitude and phase of the co and cross-polarized signal levels are measured separately 627 in the receiver 509 and 511 for both polarizations generated by the transmitter at 411, resulting in four values. The four measurements in this example constitute a scattering matrix representation of the ground surface reflection characteristics as $$\bar{S} = \begin{bmatrix} S_{HH} & S_{HV} \\ S_{VH} & S_{VV} \end{bmatrix},$$

where the subscripts H denote horizontal and V for vertical polarization scattering coefficients.

For example, the $S_{HV}$ scattering coefficient refers to the transmitted horizontal polarization as measured by the receiver vertical polarization terms, in amplitude and phase.

Then, in 629, the polarization elliptical ratio responses are determined by sequentially transmitting orthogonal pairings and measuring the differences in the responses obtained from the reflected signals. For example, by sending a vertically then horizontally polarized signal, and monitoring the receiver cross-polarized channel (horizontal then vertical polarization, respectively), the response from the reflected surface should be greater than that of the direct path (since the direct path is reduced in level due to the antenna pattern, and cross-polarized as viewed by the receiver), limited only by system hardware isolation performance. When transmitting any arbitrary polarization, the degree of signal depolarization provides a measure of the target scattering properties. The amplitude and phase of the cross-polarized signal levels are measured to monitor the depolarization ratios obtained from both transmissions in 627.

From measuring a combination of two cross-polarized ratios, corrections to the height of the vehicle due to tilt can be determined and posted as shown in step 631. The ratios are monitored and compared over a multiple of measurements to determine the extent that changing surface conditions are contributing to the depolarization of the reflected signals.

In step 633, a decision is made as to suitability of the transmitted polarization ratios for ride height monitoring, and the ellipticity of those ratios altered. For example, instead of transmitting purely linear vertical and horizontal polarizations, slant linear or elliptical ratios will probably provide a more suitable surface reflection response due to the downtilt angles involved. The transmit polarization is changed by the combination of the amplitude and phase angles sent to the dual polarized transmit antenna. Then, in step 635 ground surface conditions are determined by monitoring the changes in the reflected signal responses as they change during the signal pulses, and posted to external routines. These ground surface conditions can include but are not limited to, ground surface roughness, detection of ice, water, or snow on the ground surface, as determined by the change in complex reflection scattering matrix data for such materials at varying angles of incidence at the frequency of operation. The routine 600 is then repeated starting at step 605.

In conclusion an improved approach for measuring various vehicle-ground surface parameters such as vehicle planar velocity in orthogonal directions, true ground speed, vehicle front to rear tilt, vehicle-ground surface height has been described above.

Furthermore, the decoder comprises means for determining vehicle height dependent on a measured difference in path length between the direct path and the reflected path, vehicle front to rear tilt angle dependent on polarization elliptical ratio changes between the direct path and the reflected path, and road surface conditions dependent on amplitude and phase changes that occur versus time from the direct path and the reflected path.

What is claimed is:

1. A device for measurement between a vehicle and a ground surface comprising:

a transmitter-antenna for emitting energy toward the ground surface in a first polarization and a second polarization;

a receiving antenna oriented facing toward the ground surface for receiving energy reflected from the ground surface along a reflected path in both the first and second polarizations, the receiving antenna providing phase and amplitude signals corresponding to energy received along the reflected path for each of the first and second polarizations; and a decoder for providing separate indications of forward and sideward velocity of the vehicle relative to the ground surface dependent on the provided phase and amplitude signals for each of the first and second polarizations.

2. A device in accordance with claim 1 wherein the second polarization is oriented orthogonally to the first polarization.

3. A device in accordance with claim 1 wherein the decoder further comprises means for determining a vehicle front to rear tilt angle dependent on changes in a polarization elliptical ratio of the phase and amplitude signals received by the receiving antenna.

4. A device in accordance with claim 1 wherein the decoder further comprises means for determining road surface conditions dependent on amplitude and phase changes of the phase and amplitude signals received by the receiving antenna that occur over time.

5. A device in accordance with claim 1 wherein the transmitter-antenna has a structure for emitting energy directly toward the receiving antenna and the receiving antenna has a portion oriented to receive the energy emitted directly from the transmitter-antenna along a direct path, and wherein the decoder further comprises means for indicating a height difference between the vehicle and the ground surface dependent on a measured difference in path length between the direct path and the reflected path.

6. A device in accordance with claim 5 wherein the decoder comprises:

a quadrature receiver for producing separate in-phase and quadrature signal channels;

a phase detector for providing a signal representative of a phase difference between the portion of the emitting energy along the direct path and portion of the emitting energy reflected from the ground surface along the reflected path; and a Doppler detector connected to the phase detector to measure difference frequencies generated by a difference in path length between the direct and reflected signal paths.

7. A device for measurement between a vehicle and a ground surface comprising:

a transmitter-antenna for emitting energy directed down toward the ground surface and in a second direction, wherein the energy has a first polarization and a second polarization oriented orthogonally to the first polarization;

a receiving antenna, having a portion oriented facing opposing the second direction for receiving a portion of the emitting energy along a direct path, and a portion oriented facing downwardly toward the ground surface for receiving a portion of the emitting energy reflected from the ground surface along a reflected path, the receiving antenna providing phase and amplitude signals corresponding to energy received along the reflected path for each of the first and second polarizations; and a decoder for providing separate indications of forward and sideward velocity relative to motion of the vehicle along the ground surface dependent on the provided phase and amplitude signals for each of the first and second polarizations, and an indication of height between the vehicle and the ground surface dependent on a measured difference in path length between the direct path and the reflected path.

8. A device in accordance with claim 7 wherein the decoder further comprises means for determining a vehicle front to rear tilt angle dependent on changes in a polarization elliptical ratio of the phase and amplitude signals received by the receiving antenna.

9. A device in accordance with claim 7 wherein the decoder further comprises means for determining road surface conditions dependent on amplitude and phase changes of the phase and amplitude signals received by the receiving antenna that occur over time.

10. A device for measurement between a vehicle and a ground surface comprising:

a transmitter-antenna for emitting energy directed down toward the ground surface and in a second direction, wherein the energy has a first polarization and a second polarization oriented orthogonally to the first polarization;

a receiving antenna having a first polarization, and a second polarization orthogonally oriented to the first polarization, wherein the receiving antenna is oriented to receive a portion of the energy emitted from the transmitter-antenna directed parallel to the ground surface along a direct path, and a portion of the energy emitted from the transmitter-antenna reflected off the ground surface along a reflected path, and wherein the receiving antenna provides a forward Doppler signal corresponding to the direct and reflected signals received by the portion of the receiving antenna oriented with the first polarization, and provides a lateral Doppler signal corresponding to the direct and reflected signal received by the portion of the receiving antenna oriented with the second polarization; and a decoder for providing separate indications of forward and sideward velocity relative to motion of the vehicle along the ground surface dependent on the received forward and (sideward)lateral Doppler signals.

11. A device in accordance with claim 10 wherein the receiving antenna generates a direct path length signal, dependent on a physical distance between the transmitter-antenna and the receiving antenna along the direct path, and a reflected path length signal, dependent on a physical distance between the transmitter-antenna and the receiving antenna along the reflected path; and the decoder provides an indication of height between the vehicle and the ground surface dependent on a measured difference in path length between the direct path and the reflected path in accordance with a first polarization.

12. A device in accordance with claim 11 wherein the decoder further comprises means for determining a vehicle front to rear tilt angle dependent on changes in a polarization elliptical ratio of phase and amplitude signals received by the receiving antenna.

13. A device in accordance with claim 12 wherein the decoder further comprises means for determining road surface conditions dependent on amplitude and phase changes of signals sensed by the receiving antenna that occur over time.

14. A method for measurement between a vehicle and a ground surface comprising the steps of:

emitting energy toward the ground surface in a first polarization and a second polarization;

receiving energy reflected from the ground surface along a reflected path in both the first and second polarizations and providing phase and amplitude signals corresponding to energy received along the reflected path for each of the first and second polarizations; and providing separate indications of forward and sideward velocity of the vehicle relative to the ground surface dependent on the provided phase and amplitude signals for each of the first and second polarizations.

15. A method in accordance with claim 14 wherein the step of providing separate indications of forward and sideward velocity further comprises a step of determining a vehicle front to rear tilt angle dependent on changes in a polarization elliptical ratio of the phase and amplitude signals received in the step of receiving energy reflected from the ground surface.

16. A method in accordance with claim 14 the step of providing separate indications of forward and sideward velocity further comprises a step of determining road surface conditions dependent on amplitude and phase changes of the phase and amplitude signals received in the step of receiving energy reflected from the ground surface.

17. A method in accordance with claim 14 further comprising the steps of:

emitting energy directly toward a receiving antenna;

receiving the energy emitted directly toward the receiving antenna along a direct path; and indicating a height difference between the vehicle and the ground surface dependent on a measured difference in path length between the direct path and the reflected path.

* * * * *